Patented June 10, 1941

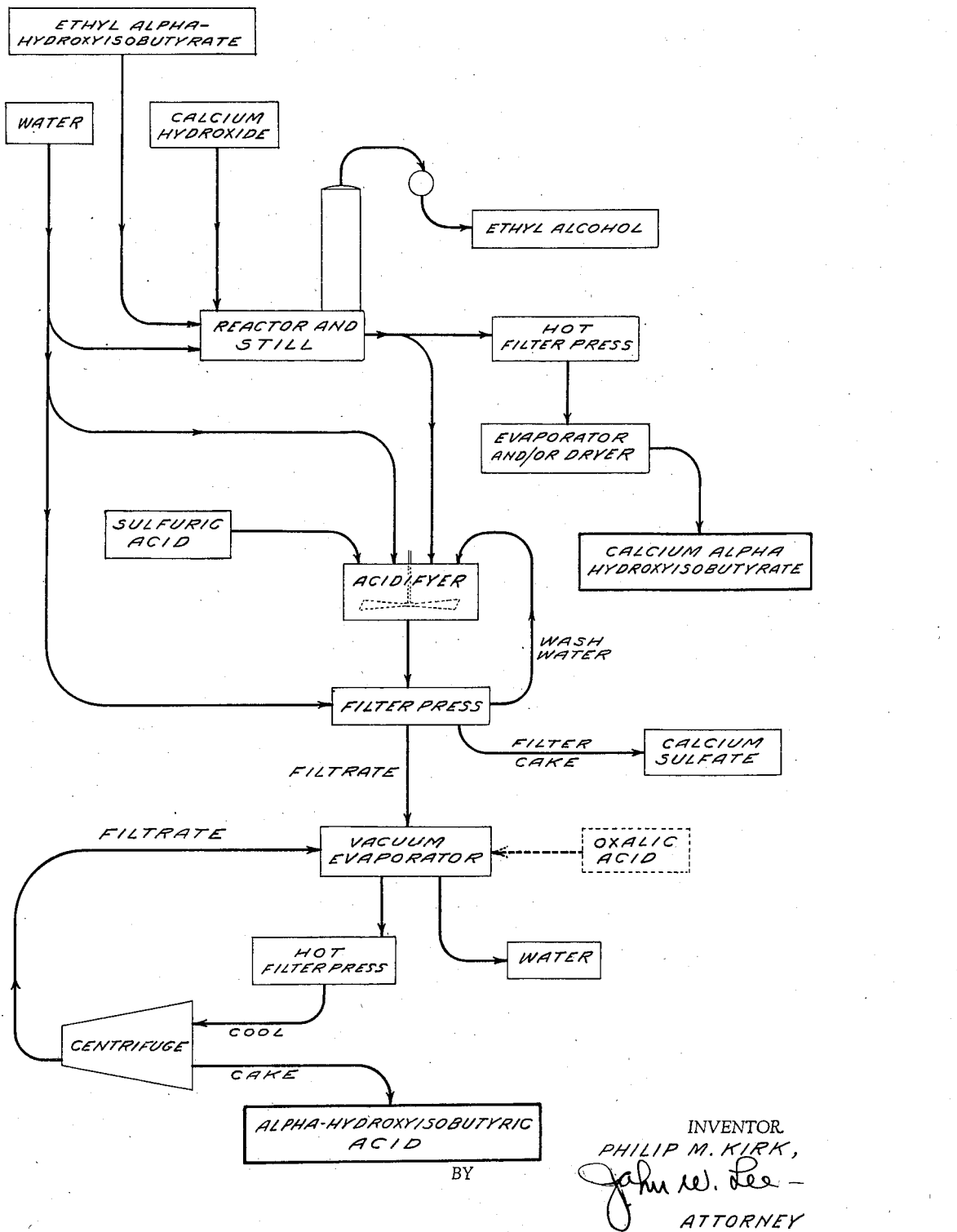

2,245,483

UNITED STATES PATENT OFFICE 2,245,483

PREPARATION OF CALCIUM ALPHA HYDROXYISOBUTYRATE

Philip Moore Kirk, Old Greenwich, Conn., assignor to American Cyanamid Company, New York, N. Y., a corporation of Maine Application August 31, 1940, Serial No. 355,072

9 Claims. (Cl. 260—535)

This invention relates to a method of preparing substantially pure calcium alpha hydroxyisobutyrate and substantially pure alpha hydroxyisobutyric acid from an ester of alpha hydroxyisobutyric acid.

It is well known that alpha hydroxyisobutyric acid can be obtained by hydrolyzing acetone cyanhydrin in the presence of dilute hydrochloric acid. The process, however, is not entirely satisfactory because there is a great deal of difficulty encountered in attempting to isolate the alpha hydroxyisobutyric acid from the hydrolysis mixture in a pure state and the acid so produced is nearly always contaminated with ammonium chloride and very frequently also with hydrochloric acid, formic acid, heavy metals and small quantities of condensation products and coloring matter.

Various methods have been proposed and tried out for removing these impurities from alpha hydroxyisobutyric acid. One such method comprises extracting the impure hydrolysis mixture with an organic solvent such as benzol and then recovering the acid from the solvent. This method is not only expensive and hazardous due to the necessity for using hot benzol, but also does not result in the production of alpha hydroxyisobutyric acid free from contamination. One other proposed method comprises isolating the alpha hydroxyisobutyric acid by vacuum distillation and while this process eliminates the handling of hot benzol with its attendant hazards and also eliminates the filtration steps which reduce the operating costs somewhat, it still does not produce alpha hydroxyisobutyric acid free from contamination. The impure alpha hydroxyisobutyric acid produced by the above processes may be used in some technical operations such as dyeing of fabrics and tanning of leather, but it is not suitable for use in many other commercial operations, as for example, when the alpha hydroxyisobutyric acid is to be used in the production of phenolic plastics the acid must conform to rather rigid specifications.

The calcium salt of alpha hydyroxyisobutyric acid is useful in veterinary practice for treating calcium deficiency diseases such as milk fever in cattle. Calcium alpha hydyroxyisobutyrate, to be useful for this purpose, must pass U. S. P. XI tests for chlorine and heavy metals as indicated for calcium gluconate. When impure alpha hydroxyisobutyric acid is used for producing the calcium salt the impurities are usually also found in the calcium salt.

The principal object of the present invention is the provision of a novel, economical, and convenient method for preparing calcium alpha hydroxyisobutyrate and alpha hydroxyisobutyric acid in a very pure form. Another object is to provide a method for the isolation of alpha hydroxyisobutyric acid from acetone cyanhydrin, hydyrochloric acid hydrolysis mixture. A further object is the provision of a method for the production of calcium alpha hydroxyisobutyrate from esters of alpha hydroxyisobutyric acid which is characterized by high yields and purity of product. Other objects will become apparent as the description of the invention proceeds.

These objects are accomplished by first producing an ester of alpha hydyroxyisobutyric acid having a high degree of purity and then hydrolyzing the ester with calcium hydroxide to produce a high quality calcium alpha hydroxyisobutyrate. The calcium alpha hydroxyisobutyrate so produced is free from contamination with ammonium chloride, heavy metals, etc., and is satisfactory for veterinary use. To produce alpha hydroxyisobutyric acid free from contamination the calcium alpha hydroxyisobutyrate is treated with a sulfuric acid solution. The insoluble calcium sulfate produced is easily removed by filtration leaving a solution of alpha hydroxyisobutyric acid, which upon concentration results in the production of alpha hydroxyisobutyric acid free from contamination.

Alpha hydroxyisobutyric acid esters, in general, are useful as starting materials in carrying out the present invention, among which may be mentioned the esters of methyl, ethyl, propyl, butyl alcohols, and the like. The invention is not dependent upon any particular method for the production of the above esters and any suitable method may be employed. In a preferred method the esters are prepared directly from acetone cyanhydrin. For example, the ethyl ester of alpha hydroxyisobutyric acid may be prepared by adding alcoholic hydrogen chloride containing about 28% HCl to acetone cyanhydrin, maintained at a temperature of about 65° C. for a period of about one hour, and then cooling the mixture and treating with ammonium hydroxide until neutral to litmus. The ammonium chloride is then filtered off and the solution subjected to fractional distillation to recover the ethyl ester of alpha hydroxyisobutyric acid. The ester produced by this method is readily freed from impurities by the fractional distillation treatment. The ethyl ester of alpha hydroxyisobutyric acid may be, if desired, prepared directly from alpha hydroxyisobutyric acid by esterification with ethyl alcohol, employing any well-known esterification method. The preparation of the ester from the acetone cyanhydrin is preferred because it eliminates the necessity for hydrolyzing the nitrile to the corresponding acid prior to the esterification process, and hence is the most economical method.

In carrying out this invention ethyl alpha hydroxyisobutyrate is reacted with calcium hydroxide in a suitable vessel, preferably one which can be heated and which permits recovery of the alcohol liberated during the reaction. The calcium alpha hydroxyisobutyrate produced by this reaction, if it is to be used as a veterinary product, is very easily purified by simple crystallization or concentration. When the calcium alpha hydroxyisobutyrate is to be used for the production of alpha hydroxyisobutyric acid it is not necessary to separate the salt from the aqueous slurry. The necessary quantity of sulfuric acid to liberate the alpha hydroxyisobutyric acid is added directly to the aqueous slurry to produce the water-insoluble calcium sulfate. The calcium sulfate is then separated from the alpha hydroxyisobutyric acid by any suitable filtration method and the pure alpha hydroxyisobutyric acid recovered from the filtrate by concentration. In carrying out the process it is important that equipment be used which will not introduce heavy metals into the finished products.

The process is more fully illustrated by the flow sheet which represents one method for carrying out the process. In the flow sheet ethyl alpha hydroxyisobutyrate, calcium hydroxide, and water in the proper proportions are added to the reactor and still. In the reactor calcium alpha hydroxyisobutyrate is produced and ethyl alcohol is liberated. The temperature of the reactor and still is regulated so that about 90% or more of the ethyl alcohol is recovered. The calcium alpha hydroxyisobutyrate slurry from the reactor is passed to a hot filter press. Any insoluble impurities which may be present remain in the filter and the filtrate passes to an evaporator and/or drier where the pure calcium alpha hydroxyisobutyrate is recovered. In producing alpha hydroxyisobutyric acid, the calcium alpha hydroxyisobutyrate slurry from the reactor is passed to an acidifier where an equivalent quantity of dilute sulfuric acid is added to liberate the alpha hydroxyisobutyric acid and to produce a precipitate of calcium sulfate. The slurry from the acidifier is passed to a filter press. From the filter press a filter cake of calcium sulfate is obtained, and the alpha hydroxyisobutyric acid in the filtrate is passed to a vacuum evaporator. In a preferred method the calcium sulfate filter cake is washed with water and the wash water passed back into the circuit by way of the acidifier. The filtrate, after concentration in the vacuum evaporator, is passed to a hot filter press where any remaining calcium sulfate is effectively removed. In some cases it may be desirable to add a stoichiometrical equivalent of oxalic acid to the vacuum evaporator, converting the calcium sulfate which may be present to calcium oxalate. The calcium oxalate is water-insoluble and at the same time produces large particles or crystals which are more easily separated by the subsequent filtration step. The filtrate from the hot filter press is cooled and passed into a centrifuge. The cake produced in the centrifuge is alpha hydroxyisobutyric acid in a very pure form. The filtrate from the centrifuge may be, if desired, returned to the vacuum evaporator to insure complete recovery of the alpha hydroxyisobutyric acid.

The invention will be further illustrated in greater detail by the following specific examples. Parts indicated are by weight.

Example 1

528 parts of ethyl alpha hydroxyisobutyrate, 148.2 parts of calcium hydroxide and 500 parts of water are placed in a vessel immersed in an oil bath and fitted with condenser, stirrer, and thermometer. The mixture is added at a temperature of about 24° C. The mixture heats spontaneously and the temperature rises to about 78° C. in 7 or 8 minutes without the application of external heat. The mixture is then subjected to distillation and about 90% of the alcohol is recovered. About 500 parts of water are added to the slurry of calcium alpha hydroxyisobutyrate remaining in the vessel and the hot solution is filtered free of suspended matter. The filtrate is concentrated and the calcium alpha hydroxyisobutyrate recovered and dried. 485 parts of a white product are obtained representing a 98% yield of calcium alpha hydroxyisobutyrate. The product was dried to constant weight in an oven at 105° C. and analyzed, and was found to be 100% calcium alpha hydroxyisobutyrate. The product was neutral to phenol red and passed the U. S. P. XI test for heavy metals.

Example 2

264 parts of ethyl alpha hydroxyisobutyrate, 74.1 parts of calcium hydroxide, and 180 parts of water are placed in a vessel immersed in an oil bath and fitted with condenser, stirrer, and thermometer. The mixture heats spontaneously and the temperature rapidly rises to about 75° C. as the calcium hydroxide dissolves and the calcium alpha hydroxyisobutyrate precipitates. The charge forms a stiff paste which is then heated for removal of the alcohol by fractional distillation. About 90% of the alcohol is recovered in this distillation operation. The slurry remaining in the reaction flask is diluted with about 250 parts of water and transferred to a suitable reaction vessel and the temperature maintained at about 75° C. with very rapid stirring while an equivalent quantity of sulfuric acid (as 50% solution) is added. This produces a pasty suspension of calcium sulfate which is diluted with about 250 parts of water and filtered hot. The filter cake is washed with about 125 parts of water. The wash water and filtrate are combined and then evaporated at a reduced pressure until the volume represents about 250 parts. This solution is then filtered while hot (80° C.) to remove any trace of calcium sulfate. The solution is cooled and the alpha hydroxyisobutyric acid crystals removed by filtration. The filtrate is evaporated further to about 75 parts, cooled, and a second crop of crystals obtained. The combined yield was about 152 parts or 73% of the theoretical. Upon analysis the product was found to be 99.07% alpha hydroxyisobutyric acid and was free from contamination.

In a series of 5 experiments carried out in accordance with the process described in the flow sheet, in which the wash water from the calcium sulfate filter cake was returned to the acidifier and the filtrate from the alpha hydroxyisobutyric acid centrifuge cake was returned to the vacuum evaporator, the yields and quality of the product were better than those obtained on individual batch processes. The alpha hydroxyisobutyric acid obtained was of unusual purity, was perfectly white in the crystalline state, gave colorless solutions which were free from contamination with iron as well as other materials. The over-all yield of alpha hydroxyisobutyric acid in this series of tests was about 88% of theory and in the case of alcohol recoveries was about 92% of theory. In this series of experiments the ethyl alpha hydroxyisobutyrate was produced directly from acetone cyanhydrin.

In the above examples ethyl alpha hydroxyisobutyrate was used as the starting ester. The ethyl ester was used solely because of its availability and cheapness, and it should be understood that any other alpha hydroxyisobutyric acid ester may be used.

While the invention has been described with particular reference to specific embodiments, it is to be understood that it is not to be limited thereto and is to be construed broadly and restricted solely by the scope of the appended claims.

What I claim is:

1. A method of preparing calcium alpha hydroxyisobutyrate and alpha hydroxyisobutyric acid which comprises reacting an alpha hydroxyisobutyric acid ester with calcium hydroxide to produce calcium alpha hydroxyisobutyrate and then treating a portion of the calcium alpha hydroxyisobutyrate with sulfuric acid to produce calcium sulfate and alpha hydroxyisobutyric acid.

2. A method of preparing calcium alpha hydroxyisobutyrate and alpha hydroxyisobutyric acid from acetone cyanhydrin which comprises converting the acetone cyanhydrin to an alpha hydroxyisobutyric acid ester, purifying the ester by distillation, treating the purified ester with calcium hydroxide to produce calcium alpha hydroxyisobutyrate and neutralizing a portion of the calcium alpha hydroxyisobutyrate with sulfuric acid to produce calcium sulfate and alpha hydroxyisobutyric acid.

3. A method of preparing calcium alpha hydroxyisobutyrate and alpha hydroxyisobutyric acid which comprises reacting ethyl alpha hydroxyisobutyrate with calcium hydroxide to produce calcium alpha hydroxyisobutyrate and then treating a portion of the calcium alpha hydroxyisobutyrate with sulfuric acid to produce calcium sulfate and alpha hydroxyisobutyric acid.

4. A method of preparing calcium alpha hydroxyisobutyrate and alpha hydroxyisobutyric acid from acetone cyanhydrin which comprises converting the acetone cyanhydrin to ethyl alpha hydroxyisobutyrate, purifying the ethyl alpha hydroxyisobutyrate by distillation, treating the purified ethyl ester with calcium hydroxide to produce calcium alpha hydroxyisobutyrate and neutralizing a portion of the calcium alpha hydroxyisobutyrate with sulfuric acid to produce calcium sulfate and alpha hydroxyisobutyric acid.

5. A method of preparing calcium alpha hydroxyisobutyrate from acetone cyanhydrin which comprises converting the acetone cyanhydrin to an ester of alpha hydroxyisobutyric acid, treating the alpha hydroxyisobutyric acid ester with calcium hydroxide to produce calcium alpha hydroxyisobutyrate.

6. A method of producing substantially pure calcium alpha hydroxyisobutyrate which comprises treating a substantially pure alpha hydroxyisobutyric acid ester with calcium hydroxide and recovering and purifying the calcium alpha hydroxyisobutyrate produced.

7. A method of producing substantially pure calcium alpha hydroxyisobutyrate which comprises treating a substantially pure ethyl alpha hydroxyisobutyrate with calcium hydroxide and recovering and purifying the calcium alpha hydroxyisobutyrate produced.

8. A method of preparing alpha hydroxyisobutyric acid from acetone cyanhydrin which comprises converting acetone cyanhydrin to an alpha hydroxyisobutyric acid ester, reacting the alpha hydroxyisobutyric acid ester with calcium hydroxide to produce calcium alpha hydroxyisobutyrate, reacting the calcium alpha hydroxyisobutyrate with sulfuric acid to produce calcium sulfate and alpha hydroxyisobutyric acid, and separating the alpha hydroxyisobutyric acid from said calcium sulfate.

9. A method of preparing alpha hydroxyisobutyric acid which comprises reacting ethyl alpha hydroxyisobutyrate with calcium hydroxide to produce calcium alpha hydroxyisobutyrate and then reacting the calcium alpha hydroxyisobutyrate with sulfuric acid to produce calcium sulfate and alpha hydroxyisobutyric acid and separating the alpha hydroxyisobutyric acid from the calcium sulfate.

PHILIP MOORE KIRK.